United States Patent [19]

Tsuboi

[11] Patent Number: 4,706,774
[45] Date of Patent: Nov. 17, 1987

[54] MOTORCYCLE REAR SUSPENSION SUBASSEMBLY

[75] Inventor: Masaharu, Tsuboi, Saitama, Japan

[73] Assignee: Honda Giken Kogyo Kabushiki Kaisha, Tokyo, Japan

[21] Appl. No.: 865,537

[22] Filed: May 21, 1986

[30] Foreign Application Priority Data

May 22, 1985 [JP] Japan ................... 60-109899

[51] Int. Cl.⁴ ................. B62K 11/04; B62K 25/04
[52] U.S. Cl. ....................... 180/227; 180/291; 280/285
[58] Field of Search ............. 280/285, 281 R, 283, 280/284, 286, 288, 275; 180/219, 227, 291, 228

[56] References Cited

U.S. PATENT DOCUMENTS

| 4,139,072 | 2/1979 | Dawson | 180/312 |
| 4,280,582 | 7/1981 | Kouyama | 180/219 |
| 4,323,135 | 4/1982 | Tominaga | 180/228 |
| 4,427,087 | 1/1984 | Inoue | 180/219 |
| 4,482,024 | 11/1984 | Matsuda | 180/219 |
| 4,556,119 | 12/1985 | Shiratsuchi | 180/227 |
| 4,585,247 | 4/1986 | Takada | 280/281 R |

FOREIGN PATENT DOCUMENTS

| 82496 | 6/1983 | European Pat. Off. |
| 1152863 | 2/1958 | France. |
| 2480699 | 10/1981 | France. |
| 768547 | 2/1957 | United Kingdom. |
| 2015949 | 9/1979 | United Kingdom. |

Primary Examiner—David M. Mitchell
Assistant Examiner—Everett G. Diederiks, Jr.
Attorney, Agent, or Firm—Lyon & Lyon

[57] ABSTRACT

A motorcycle arrangement including a conventional head pipe with rectangular main pipe and down pipe elements rigidly attached to an engine to define triangular truss structures to create a rigid frame. Brackets cooperate with the ends of the main pipes to affix same relative to the engine. The brackets may be employed as part of a subassembly including the rear suspension. The rear swing arm and the cushion member are both attached to the bracket structure and may be removed from the frame together. Other components may be most advantageously coupled with a bracket structure to avoid excessive use of the frame itself for such mounting functions. Such items as footpegs, gear shift pedals and retractable stands may be fixed to side brackets for easy preassembly and reduced complexity.

12 Claims, 12 Drawing Figures fig.1.

MOTORCYCLE REAR SUSPENSION SUBASSEMBLY

BACKGROUND OF THE INVENTION

The field of the present invention is frame structures for motorcycles, including rear suspension mounting systems.

Conventional motorcycle design has generally employed a frame system which may or may not include as a portion thereof the engine structure. To this frame structure various components of the motorcycle are attached. Separately attached are the rear suspension, the cushion assembly for the rear suspension, and other components such as the footpegs and the retractable stand. Consequently, assembly of the motorcycle may be complicated by the requirement to attach individual components to the frame itself. As a result, advantageous employment of subassemblies cannot be realized.

In such motorcycles, the frame structures to which the many components are assembled must undertake to support the varying forces on the vehicle encountered during use. Conventional frame structures, whether or not they incorporate the engine as a component thereof, are arranged with main body frame members and down-tube members which are fabricated from multiple components or from a bending of such components to generally define a diamond-shaped structure which requires the individual frame elements to withstand substantial stresses. In some systems, the stress is in part withstood by the substantial engine structure so that weight can be minimized. However, such conventional systems still require relatively sturdy structures and multiple mounting plates and devices to accommodate such traditianal designs.

SUMMARY OF THE INVENTION

The present invention is directed to motorcycle structures designed to facilitate manufacture and reduce weight and complexity. To this end, a separate mounting system for the rear suspension is incorporated with the frame of the vehicle to enhance assembly procedures and reduce weight. A rear suspension bracket is employed in association with the frame for the mounting of the rear suspension assembly. Additional side brackets are incorporated outwardly of the rear suspension bracket to receive and appropriately mount multiple elements to the motorcycle.

In further aspects of the present invention, a truss frame arrangement is employed creating a triangular frame structure as seen from the side through employment of main pipes, down pipes and the engine structure. Additionally, the rear suspension bracket may be associated with the engine to add further rigidity to the vehicle.

Accordingly, it is an object of the present invention to provide an improved structural arrangement for a motorcycle to facilitate assembly and reduce weight and complexity of the vehicle.

DETAILED DESCRIPTION OF THE PREFERRED EMBODIMENTS

Figure 1:
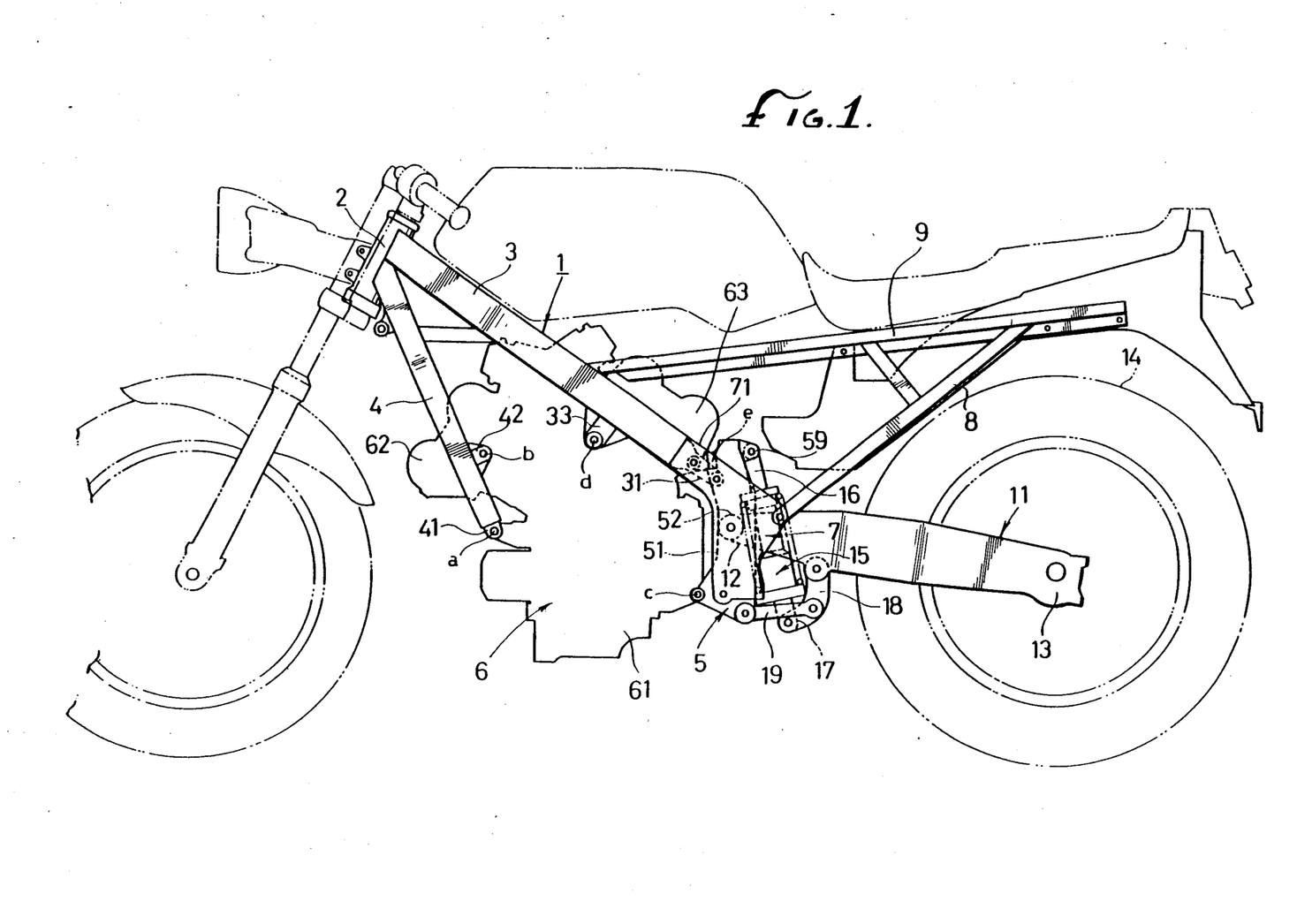
FIG. 1 is a side elevation of a motorcycle structure with additional components illustrated in phantom.

Turning in detail to the drawings, FIG. 1 illustrates a first embodiment of the present invention including a frame, generally designated 1, employing a conventional head pipe 2, left and right main body pipes 3 and left and right down pipes 4. The main body pipes 3 and down pipes 4 extend rearwardly and downwardly from the head pipe 2 and are straight as seen in side view. The main pipes 3 and down pipes 4 are also each formed of rectangular pipes having a cross section with the longest dimension in the vertical direction. As can be seen from the views in FIGS. 2 and 3, the main pipes 3 and down pipes 4 emanate from the head pipe 2 and extend outwardly to avoid the centrally mounted engine, generally designated 6.

The left and right main pipes 3 extend rearwardly to mounting members 31. Each of the mounting members 31 at the end of the main pipes 3 include two mounting holes 32 arranged fore-and-aft thereon. Extending between the mounting members 31 and removably mounted to the frame by means of the mounting holes 32 is a rear suspension bracket, generally designated 5. The bracket 5 extends between the main pipes 3 to provide additional structure to the overall assembly.

Figure 9:
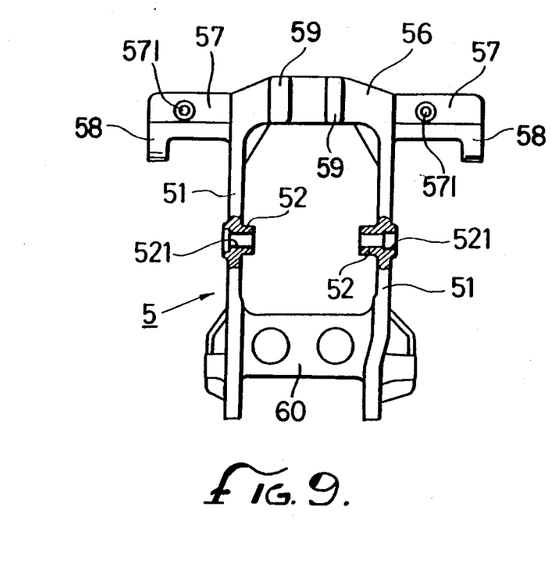
FIG. 9 is a back elevation view of the rear suspension bracket of the preferred embodiment.
Figure 10:
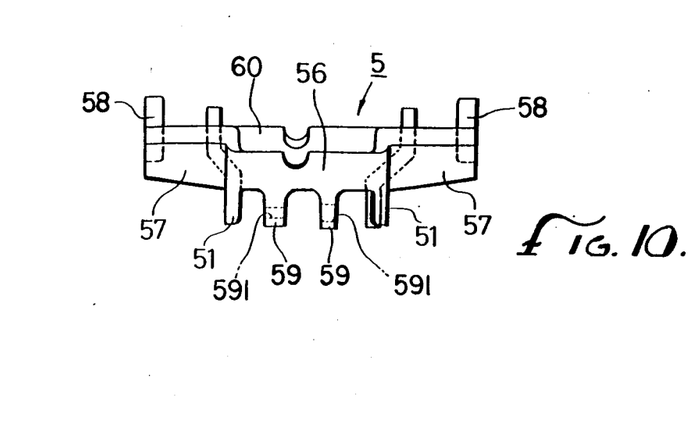
FIG. 10 is a plan view of the bracket of FIG. 9.
Figure 11:
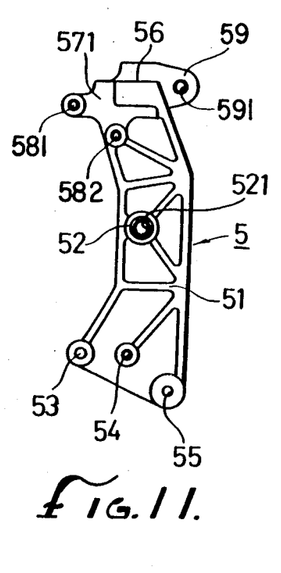
FIG. 11 is a side view of the bracket of FIG. 9.

The rear suspension bracket 5 is arranged as can be best seen in FIGS. 9, 10 and 11. An upper transverse portion 56 extends across between projections 57 at either end thereof. Extending downwardly between the transverse portion 56 and each of the two projections 57 in a vertical orientation are two side portions 51. Outwardly of the two projections 57 are mounting portions 58. Mounting holes 581 and 582 face outwardly from the mounting portions 58. These mounting holes 581 and 582 cooperate with the mounting holes 32 on the mounting members 31. Stays 59 having axially aligned holes 591 extend rearwardly from the transverse portion 56.

The side portions 51 are each formed with a mounting boss 52 having a hole 521 therethrough. The holes 521 are axially aligned. At the bottom of the side portions 51 is a transverse stay 60 forming an additional brace for rigidity. At the bottom of the rear suspension bracket 5 are three mounting holes 53, 54 and 55 on each side portion 51.

Outwardly of the mounting members 31 and extending parallel to the side portions 51 are left and right side brackets, generally designated 7. The side brackets 7 are each equipped at the upper portion thereof with a mounting portion 71. Two mounting holes 72 are arranged in fore-and-aft orientation on the mounting portion 71 to cooperate with the mounting holes 32 on the mounting members 31 and the mounting holes 581 and 582 on the rear suspension bracket 5. Fasteners 25 rigidly fix the members together with the mounting members 31 sandwiched between the rear suspension bracket 5 and the left and right side brackets 7.

At the lower portion of each side bracket 7 are front and rear mounting holes 73 and 74. Above the rear mounting hole 74 on each bracket are two upper and lower mounting holes 75 and 76. Finally, a mounting hole 77 is formed in a vertically intermediate position while a mounting hole 79 is formed at a corner 78 projecting backwardly from the upper portion 71 of each side bracket 7.

An engine, generally designated 6, having a crankcase area 61 and fore-and-aft heads 62 and 63, respectively, is arranged centrally on the motorcycle frame 1. The crankcase 61 of the engine 6 is connected at its forward opposite side surfaces to the ends of the downtubes 4 at attachment portions 41. The forward cylinder head 62 is connected at its opposite side surfaces to stays 42 projecting laterally from the down tubes 4. The crankcase 61 is also connected at its rear portion at opposite side surfaces to the left and right lower attaching portions 51 of the rear suspension bracket 5 at the mounting holes 53. In addition, the rear cylinder unil 63 is connected at its opposite side surfaces to stays 33 projecting laterally from the main pipes 3. Also on the rear cylinder unit 63, on the rear surface thereof, the rear suspension bracket 5 is again attached to the cylinder by mounting holes 571.

Thus, as shown in the figures, the engine 6 is connected and supported at five points a, b, c, d and e to the main pipes 3, the down pipes 4 and the rear suspension bracket 5. The connections and the rigid structure of the engine 6 define, with the main pipes 3 and down pipes 4, a triangular truss structure as viewed in side elevation. Further, the rear suspension bracket is also rigidly coupled with the truss structure through its mountings to the main pipes 3 and the engine 6.

Figure 2:
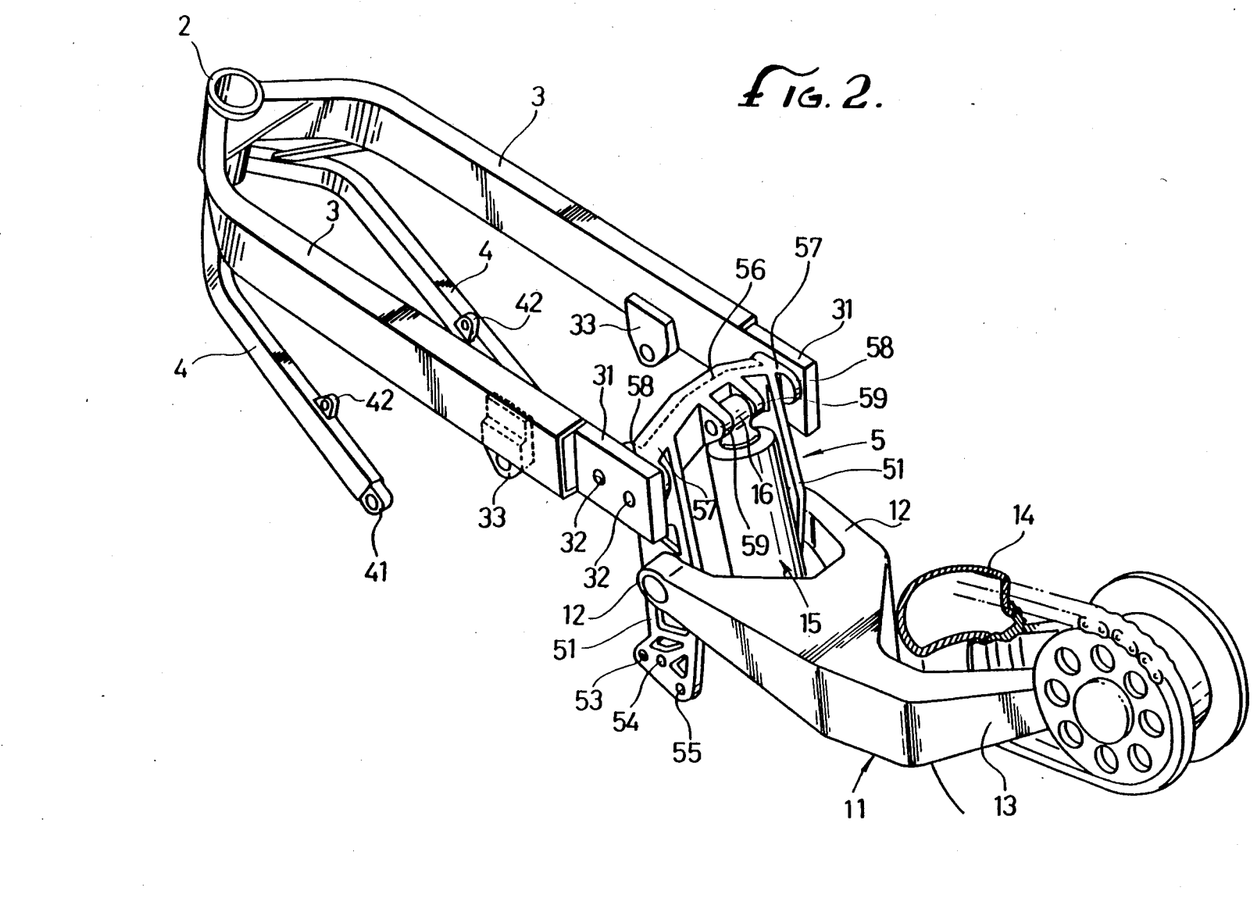
FIG. 2 is an oblique view of the motorcycle frame structure of the embodiment of FIG. 1.
Figure 3:
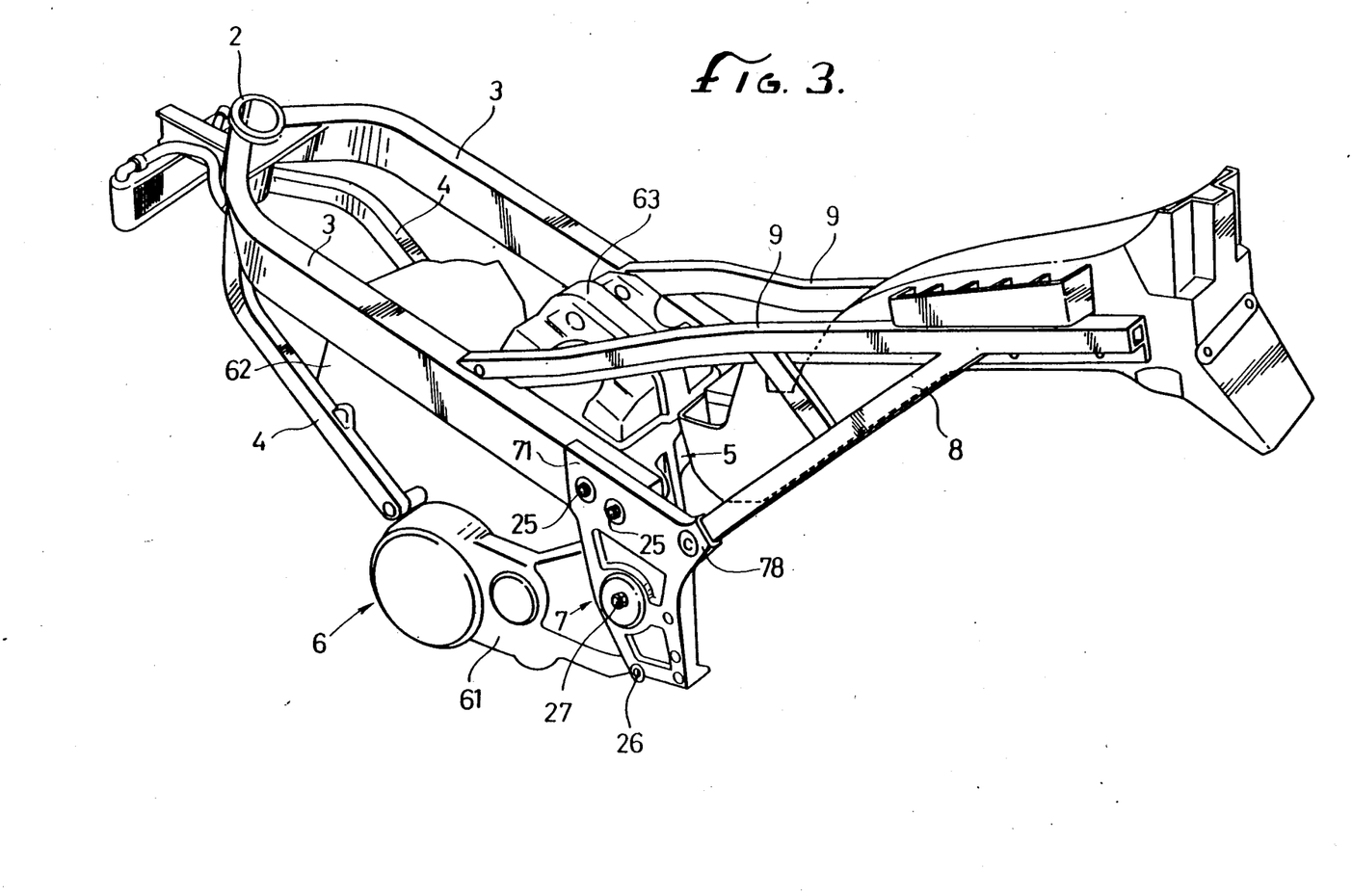
FIG. 3 is an oblique view illustrating additional frame elements and the incorporation of the motorcycle engine into the frame structure thereof.
Figure 4:
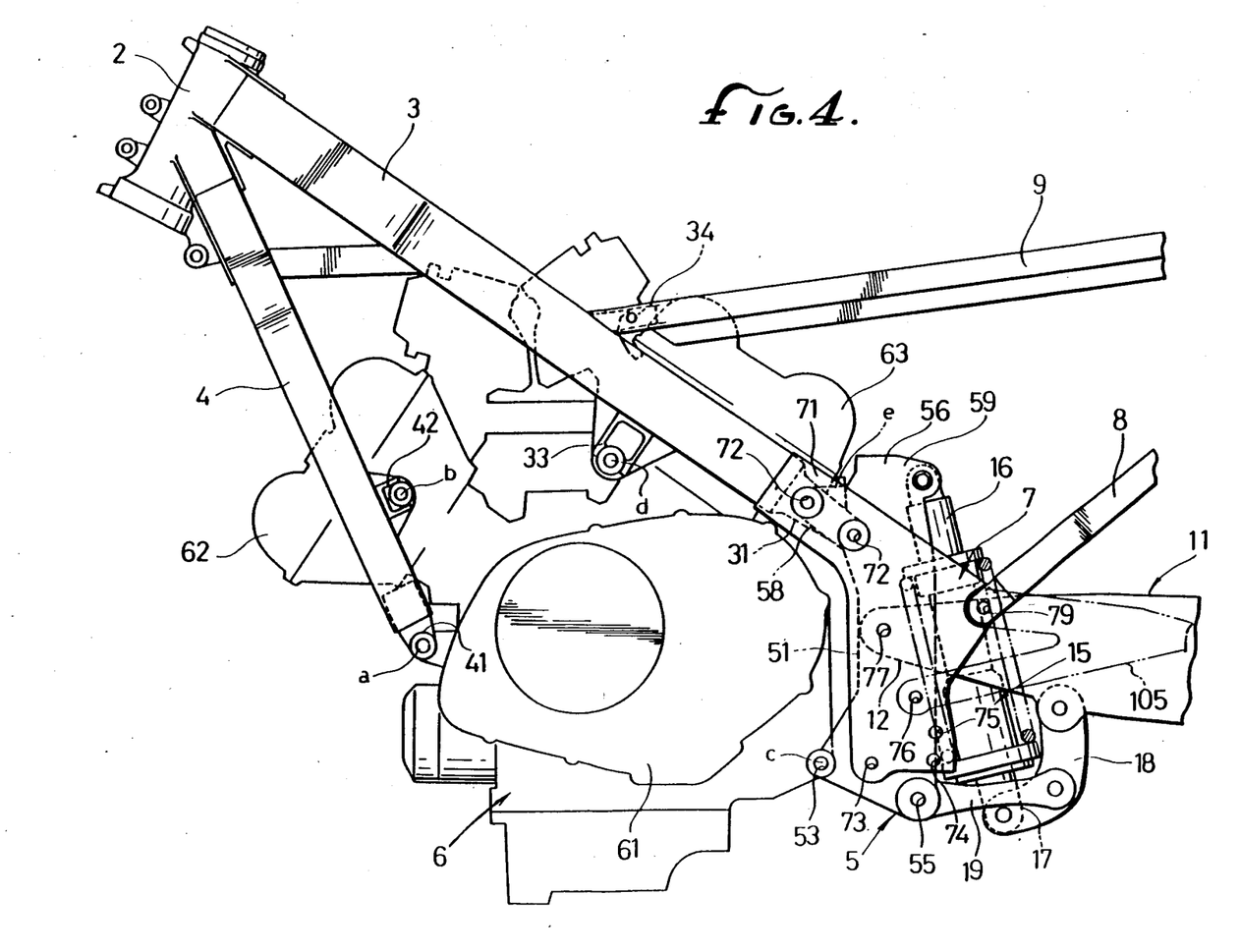
FIG. 4 is a side view illustrating the central structure of the preferred embodiment.

The motorcycle includes a rear swing arm assembly, generally designated 11 which can best be seen in FIGS. 2 and 4. The rear swing arm assembly 11 is shown to have bifurcated left and right front ends extending to pivot portions 12. Rearwardly, the bifurcated front portions merge into a cantilevered portion 13 for mounting the wheel 14 at one side thereof. The pivot portions 12 are pivotally mounted between the mounting portions 51 and the side brackets 7. The mounting hole 77 in each of the side brackets 7 aligns with the mounting holes 521 in the mounting bosses 52 of the mounting portions 51. A bolt 27 is inserted into the mounting hole 77 of the side bracket 7 and is fastened to the head of a pivot bolt 21 of the rear swing arm 11. Thus, the swing arm or suspension 11 is pivotally mounted relative to the frame of the vehicle through attachment to the brackets.

A cushion member, generally designated 15, is also attached to the brackets at the upper mounting end 16 of the cushion member. The upper mounting end 16 is fixed between the stays 59 by a fastening shaft extending through the holes 591. The other end of the cushion member 17 is associated with two links 18 and 19. The first link 18 is pivotally mounted to the swing arm 11 at one end thereof. The other end of the link 18 is pivotally mounted to the mounting end 17 of the cushion member 15. The second link 19 is pivotally mounted to the link 18 intermediate its ends and is also pivotally mounted to the mounting portion 51 of the rear suspension bracket 5. The link 19 is pinned at the mounting holes 55 through each of the brackets 51. Thus, all of the rear swing arm assembly is coupled to the bracket 5. This includes the swing arm 11 and the cushion member 15. These components may be separately assembled prior to assembly with the overall motorcycle frame. Indeed, the outer bracket 7 may be assembled as well through the use of the fastener 26 associated with mounting holes 54 in the mounting portions 51 of the rear suspension bracket 5 and 73 of each of the side brackets 7.

Figure 7:
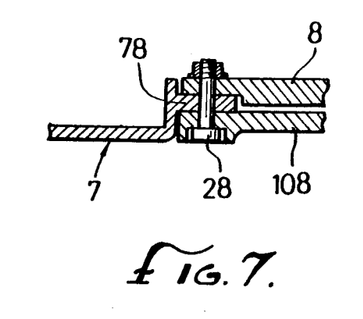
FIG. 7 is a cross-sectional view taken along line VII—VII of FIG. 5.

A further subassembly is provided for the support of the seat and rear portions of the vehicle. An underpipe 8 extends upwardly and rearwardly from an abutting position in association with the rear portion 78 of each of the side brackets 7. A hole 79 accommodates a bolt 78 to affix the underpipe 8 relative to the associated bracket. This is illustrated in FIG. 7. The underpipes 8 extend upwardly and rearwardly to seat rails 9. The seat rails 9 join at a forward end with the main pipes 3 at stays 34.

Figure 5:
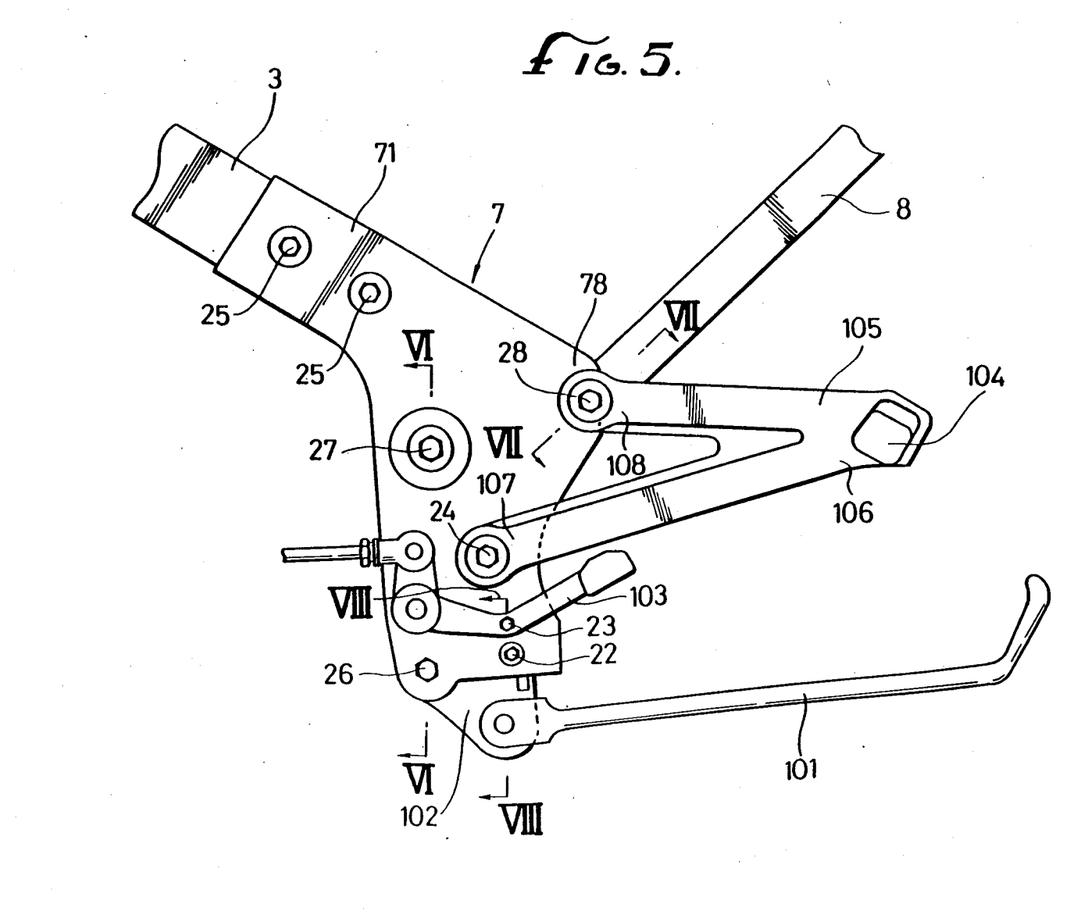
FIG. 5 is a detail side elevation principally illustrating the left side bracket and components assembled therewith.
Figure 6:
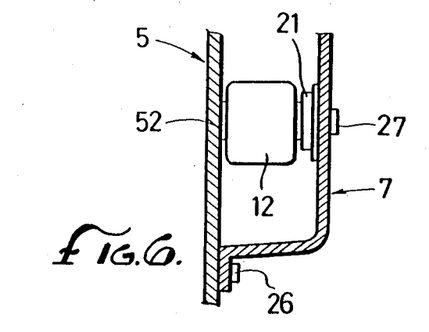
FIG. 6 is a cross-sectional view taken along line VI—VI of FIG. 5.
Figure 8:
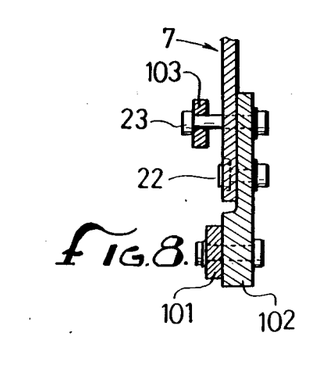
FIG. 8 is a cross-sectional view taken along line VIII—VIII of FIG. 5.

Other equipment may be associated with the subassembly including the side brackets 7. Reference is made to FIG. 5 and the sectional FIGS. 6, 7 and 8. The retractable side stand 101 is shown to be affixed to one of the side brackets 7 by means of a bracket 102. The bracket 102 is held in place to one side of the left side bracket 7 by fasteners 22 and 23. The fastener 23 also pivotally retains the shift pedal 103 as can be seen in FIG. 8. In addition, the footpegs 104 may also be attached to the side brackets 7. A support bracket for the footpeg 104 includes two legs 105 and 106 extending to ends 107 and 108 for mounting to the side bracket 7. Fasteners 24 and 28 extend through the ends of the support bracket for the footpeg 104 and into mounting holes 76 and 77 of each side member 7. Thus, a number of components may be separately assembled with a side bracket rather than requiring individual mounting and the accompanying hardware on the frame itself.

Figure 12:
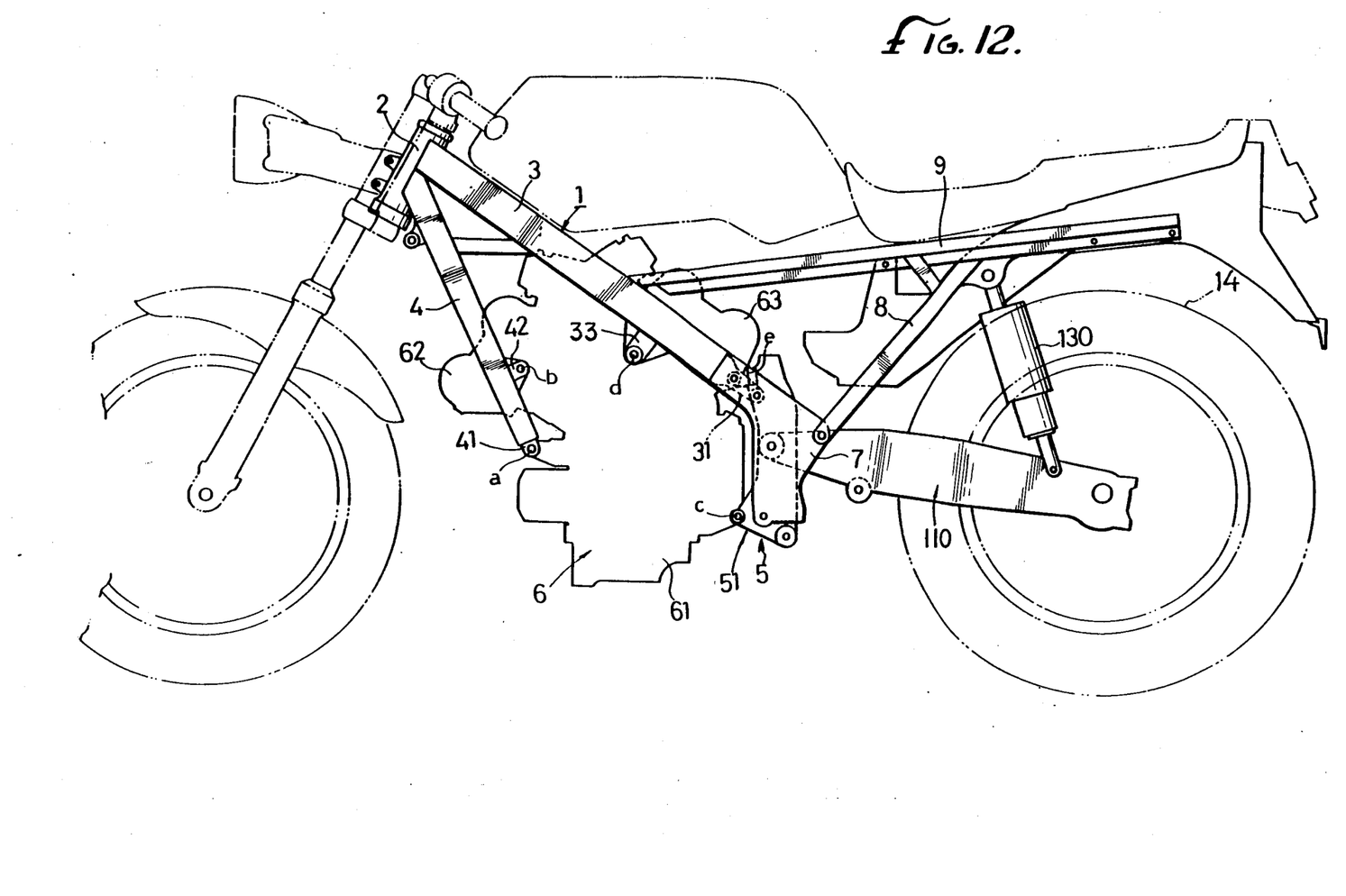
FIG. 12 is a side elevation as in FIG. 1 of a second embodiment.

A second embodiment is illustrated in FIG. 12 which incorporates the same reference numbers where identical or equivalent elements are disclosed. Differing from the prior embodiment is the rear swing arm assembly where the rear swing arm suspension 110 has cushion members 130 to either side thereof extending between the extensions of the suspension 110 upwardly to the frame structure constituting the support for the back portion of the vehicle.

Through the foregoing, motorcycle layouts have been disclosed which facilitate assembly, reduce weight and also reduce complexity. By providing substantial mounting points on the side brackets 7 as well as the rear suspension bracket 5, a plurality of elements may be attached without overcomplicating the main frame with such attachment mechanisms. The separate attachment to the brackets of such things as the footpegs, retractable stand and gear shift pedal or foot brake make preassembly of these elements possible without having to operate directly on the main frame. Assembly of the components such as the engine with the main frame can be going on independently of the subassembly of such components. In addition, the attachment of the rear suspension assembly including both the swing arm and the cushion member to brackets rather than directly to the frame allow for subassembly as well. In addition, this arrangement allows for easy disassembly for service.

In addition, the overall frame structure of the motorcycle incorporating the engine therein and having straight sections as seen from a side view to form triangular truss sections allows for lighter, sturdier construction. The brackets also provide for a rigid tying of the frame components and engine together to enhance the structural arrangement.

Accordingly, improved motorcycle arrangements have thus been disclosed facilitating assembly, reducing weight and also reducing complexity. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A motorcycle comprising:
a frame structure including a head pipe and a pair of main pipes extending from said head pipe,
said main pipes including oppositely spaced, generally parallel members having spaced terminal ends,
a rear suspension subassembly detachably connected to said frame structure, said subassembly including a rear suspension bracket containing at least one vertically elongated mounting portion and extending transversely between said main pipes with each lateral side thereof detachably connected to one of said main pipes adjacent the terminal end thereof,
a rear swing arm pivotally connected to said at least one mounting portion, and
a cushion member mounted between said rear swing arm and said frame structure for cushioning the pivoting movement of said rear swing arm.

2. The motorcycle as recited in claim 1 in which said rear suspension bracket includes means intermediate the lateral ends thereof for pivotally attaching one end of said cushion member.

3. The motorcycle as recited in claim 2 including a pair of articulated mounting links pivotally connected to said rear swing arm and to said rear suspension bracket, respectively; and the other end of said cushion member connecting with one of said mounting links.

4. The motorcycle as recited in claim 1 including a pair of oppositely spaced, generally parallel down pipes extending from said head pipe in downwardly divergent relation to said main pipes, and an engine positioned between and supportively connected to said main pipes and said down pipes to form a truss framework thereby.

5. The motorcycle as recited in claim 4 including means on said engine for affixing said rear suspension bracket.

6. A motorcycle as recited in claim 1 in which said rear suspension bracket comprises oppositely spaced vertically elongated left and right mounting portions, transversely extending support means connecting said mounting portions, and said swing arm includes a bifurcate end, the elements of which each are pivotally connected to the respective of said rear suspension bracket mounting portions.

7. A motorcycle as recited in claim 6 in which said rear suspension bracket includes pivot stays in said transversely extending support means, and said cushion member is pivotally connected at one end to said pivot stays and the other end of said cushion member is connected with said swing arm.

8. A motorcycle as recited in claim 7 in which the connection between said cushion member and said swing arm comprises a pair of articulated links, the free ends of each of which attaching to said rear support bracket and said swing arm, respectively, and said other end of said cushion member connecting with the link attaching said swing arm.

9. A motorcycle as recited in claim 6 in which said subassembly further includes a pair of side brackets, each of said side brackets cooperating with the respective lateral sides of said rear suspension bracket and an associated mounting portion to enclose the terminal end of one of said main pipes, and means for detachably connecting the terminal end of each said main pipe in sandwiched relation between a side bracket and the adjacent side of said rear suspension bracket.

10. A motorcycle as recited in claim 9 including foot pegs; and means on said side brackets for affixing said foot pegs.

11. A motorcycle as recited in claim 9 including a retractable stand; and means on at least one of said side brackets for affixing said retractable stand.

12. A motorcycle as recited in claim 9 including a gear shift pedal; and means on at least one of said side brackets for pivotally mounting said gear shift pedal.

* * * * *